US012772344B2

(12) United States Patent
Sugimoto et al.

(10) Patent No.: US 12,772,344 B2
(45) Date of Patent: Oct. 20, 2026

(54) WAFER PLACEMENT TABLE

(71) Applicant: NGK Insulators, Ltd., Nagoya-City (JP)

(72) Inventors: Hiroya Sugimoto, Chiryu-City (JP); Masaki Ishikawa, Handa-City (JP)

(73) Assignee: NGK INSULATORS, LTD., Nagoya-City (JP)

( * ) Notice: Subject to any disclaimer, the term of this patent is extended or adjusted under 35 U.S.C. 154(b) by 809 days.

(21) Appl. No.: 18/180,204

(22) Filed: Mar. 8, 2023

(65) Prior Publication Data

US 2024/0057223 A1 Feb. 15, 2024

Related U.S. Application Data

(63) Continuation of application No. PCT/JP2022/030570, filed on Aug. 10, 2022.

(51) Int. Cl.
*H05B 3/28* (2006.01)
*B32B 18/00* (2006.01)

(52) U.S. Cl.
CPC ............ *H05B 3/283* (2013.01); *B32B 18/00* (2013.01); *B32B 2260/02* (2013.01);
(Continued)

(58) Field of Classification Search
CPC .............. H05B 3/283; H05B 2203/005; H05B 2203/016; H05B 2203/017; H05B 3/143; H05B 2203/013; B32B 18/00; B32B 2260/02; B32B 2260/04; C04B 2237/343; C04B 2237/366; C04B 2237/62;
(Continued)

(56) References Cited

U.S. PATENT DOCUMENTS

2008/0142506 A1 6/2008 Torigoe
2017/0280509 A1* 9/2017 Takebayashi .......... H05B 3/286
2020/0340102 A1 10/2020 Kimura et al.

FOREIGN PATENT DOCUMENTS

JP 2008-172208 A 7/2008
JP 2015-018704 A 1/2015
(Continued)

OTHER PUBLICATIONS

Japanese Notice of Written Opposition (with English translation) dated Dec. 10, 2024 (Application No. 2023-514948).
(Continued)

*Primary Examiner* — Robert G Bachner
(74) *Attorney, Agent, or Firm* — Muncy, Geissler, Olds & Lowe, P.C.

(57) ABSTRACT

A wafer placement table includes a ceramic base having a wafer placement surface; resistance heating elements buried in the ceramic base; jumper layers having a planar shape and provided in a different layer from the resistance heating elements; an inner via connecting the jumper layer and an end of the resistance heating element; and a feed via connected to the jumper layer, wherein each of the resistance heating elements is provided for each of zones of a surface parallel to the wafer placement surface, each of the jumper layers is provided for each of the resistance heating elements, and a center-to-center distance between the inner via and the feed via in each of the jumper layers is greater than or equal to 50 mm.

10 Claims, 8 Drawing Sheets

(52) U.S. Cl.
CPC .... *B32B 2260/04* (2013.01); *H05B 2203/005* (2013.01); *H05B 2203/016* (2013.01); *H05B 2203/017* (2013.01)

(58) Field of Classification Search
CPC ........... C04B 2237/68; H01L 21/68785; H01L 21/67103; H01L 21/68757
See application file for complete search history.

(56) References Cited

FOREIGN PATENT DOCUMENTS

| | | | |
|---|---|---|---|
| JP | 2018-005998 | A | 1/2018 |
| JP | 2019-220645 | A | 12/2019 |
| JP | 2020-017686 | A | 1/2020 |
| JP | 2020-191315 | A | 11/2020 |
| WO | 2018/179891 | A1 | 10/2018 |

OTHER PUBLICATIONS

International Search Report and Written Opinion (Application No. PCT/JP2022/030570) dated Sep. 13, 2022.

English translation of the International Preliminary Report on Patentability (Chapter I) dated Feb. 20, 2025 (Application No. PCT/JP2022/030570).

* cited by examiner

WAFER PLACEMENT TABLE

BACKGROUND OF THE INVENTION

1. Field of the Invention

The present invention relates to a wafer placement table.

2. Description of the Related Art

A known ceramic heater includes an inner-peripheral-side resistance heating element and an outer-peripheral-side resistance heating element on the same plane of a ceramic base. For example, PTL 1 discloses a ceramic heater of this type in which the outer-peripheral-side resistance heating element has an end connected to one of two outer-peripheral-side feed terminals through the first conductive surface, which is disposed on a different plane of the ceramic base and intersects with the first inner-peripheral-side resistance heating element at different levels, and the other end connected to the other of the two outer-peripheral-side feed terminals through the second conductive surface, which is disposed on the different plane of the ceramic base and intersects the inner-peripheral-side resistance heating element at different levels. The first and second conductive surfaces are planar jumper layers.

CITATION LIST

Patent Literature

PTL 1: Japanese Unexamined Patent Application Publication No. 2015-18704

SUMMARY OF THE INVENTION

However, if the distance between a connection portion of the first conductive surface to which an end of the outer-peripheral-side resistance heating element is connected and a connection portion of the first conductive surface to which the outer-peripheral-side feed terminal is connected is short, the shortest route between the connection portions and its surroundings has a high current density. This may result in local heating. The same applies to the second conductive surface. The local heating has an adverse effect on the temperature control of the wafer and is undesirable.

The present invention was made to solve the above-described problem, and the main object is to reduce local heating in the jumper layer.

[1] A wafer placement table according to the present invention includes: a ceramic base having a wafer placement surface; a resistance heating element buried in the ceramic base; a jumper layer having a planar shape and provided in a different layer from the resistance heating element; an inner via connecting the jumper layer and an end of the resistance heating element; and a feed via connected to the jumper layer, wherein a center-to-center distance between the inner via and the feed via in the jumper layer is greater than or equal to 50 mm.

In the wafer placement table, the center-to-center distance between the inner via and the feed via in the jumper layer is greater than or equal to 50 mm. In this case, the current flows along relatively largely curved routes on both sides of the shortest route in addition to the shortest route. This can reduce an increase in the current density at the shortest route and its surroundings. Furthermore, the center-to-center distance is relatively long, and thus the generated heat is likely to be readily dispersed.

[2] The above-described wafer placement table (the wafer placement table according to the above-described [1]) may further include a high-resistance section in the jumper layer at a position between the inner via and the feed via to block the shortest route between the inner via and the feed via. When the high-resistance section exists, the current flows outside the high-resistance section. This can reduce an increase in the current density at the shortest route between the inner via and the feed via and its surroundings.

[3] In the above-described wafer placement table (the wafer placement table according to the above-described [2]), the high-resistance section may be a slit in each of the jumper layers. This makes it easier to reduce an increase in the current density at the shortest route between the inner via and the feed via and its surroundings, because the current cannot flow through the slit.

[4] In the wafer placement table (the wafer placement table according to the above-described [2] or [3]), the high-resistance section may intersect two tangent lines to an outline of the inner via and an outline of the feed via. The section defined by the two tangent lines allows the current to flow relatively easily, and thus heat is likely to be generated. However, in this configuration, the high-resistance section, which intersects the two tangent lines, makes it easier to reduce local heating.

[5] In the wafer placement table (the wafer placement table according to any one of the above-described [2] to [4]), the high-resistance section may be an arc-shaped section centered at one of the inner via and the feed via. With this configuration, the current flows around the arc-shaped section and largely diverts, making it easier to reduce local heating.

[6] In the above-described wafer placement table (the wafer placement table according to any one of the above-described [1] to [5]), the resistance heating element may be provided for each of zones of the ceramic base, and the jumper layer may include multi-level layers in the ceramic base.

DETAILED DESCRIPTION OF THE INVENTION

Figure 1:
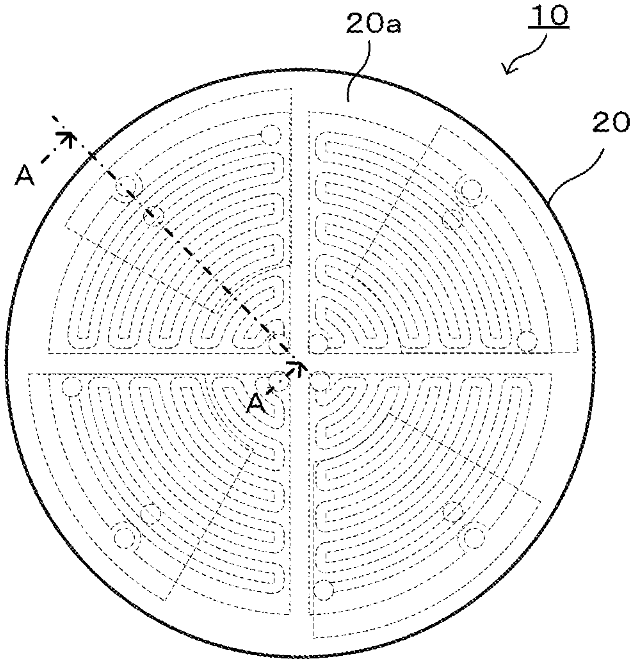
FIG. 1 is a plan view of a wafer placement table 10.
Figure 2:
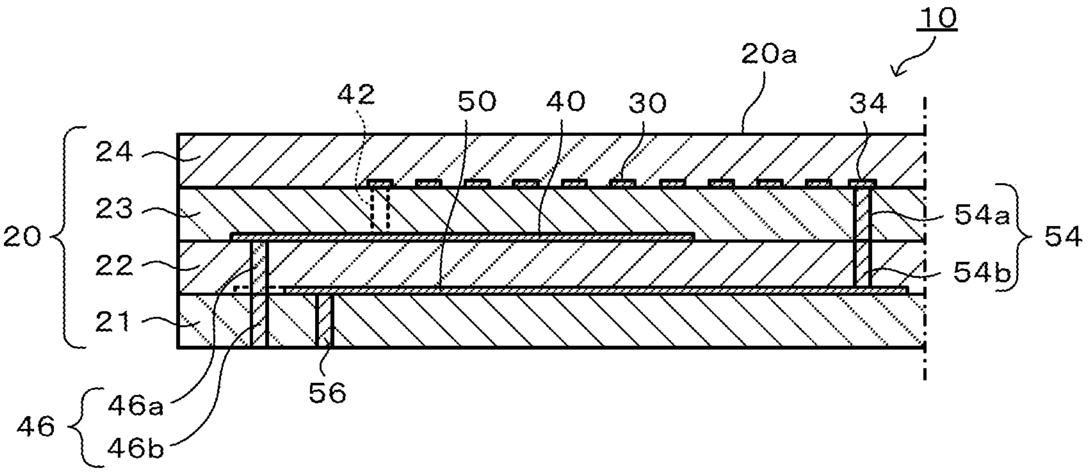
FIG. 2 is a cross-sectional view taken along A-A in FIG. 1.
Figure 3:
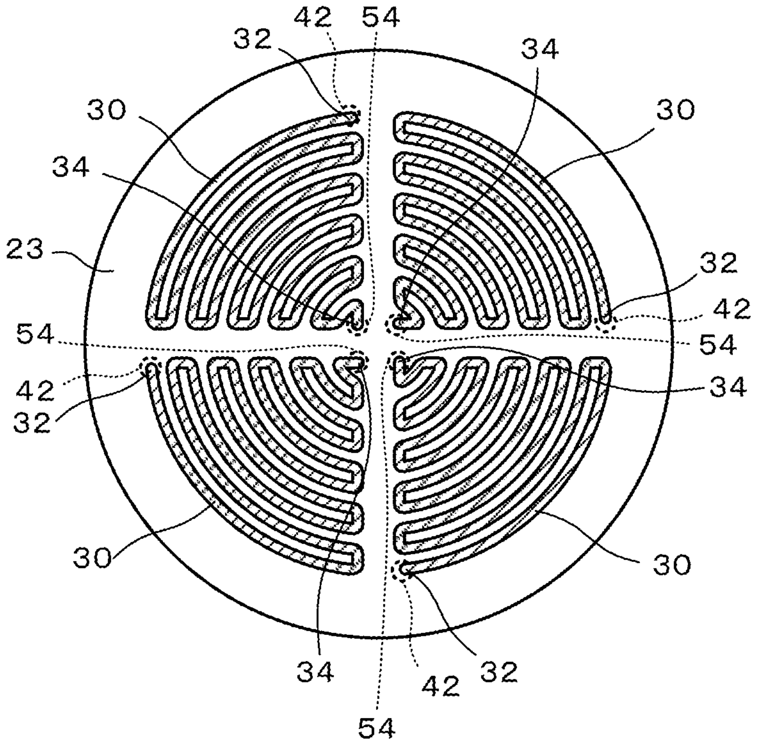
FIG. 3 is a top cross-sectional view of the wafer placement table 10 taken along an upper surface of a third ceramic layer 23.
Figure 4:
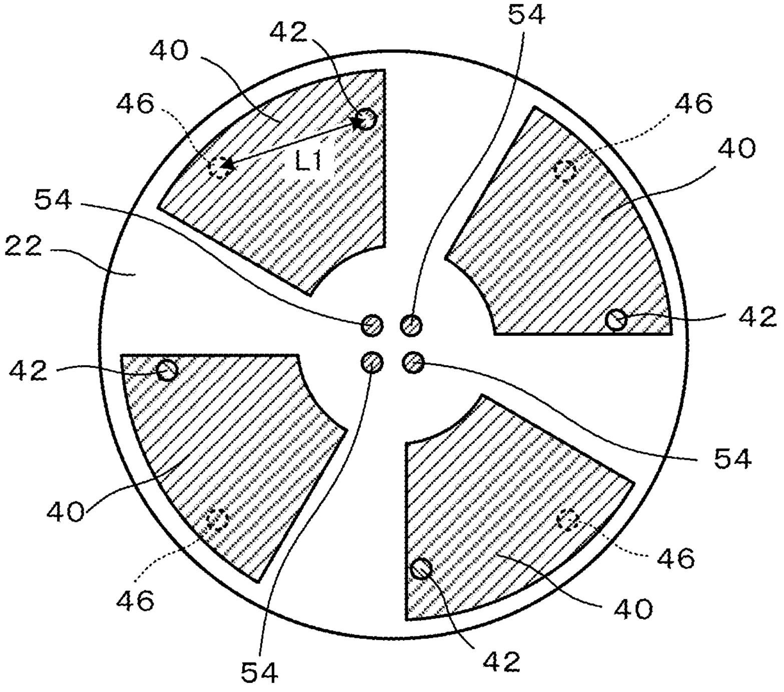
FIG. 4 is a top cross-sectional view of the wafer placement table 10 taken along an upper surface of a second ceramic layer 22.
Figure 5:
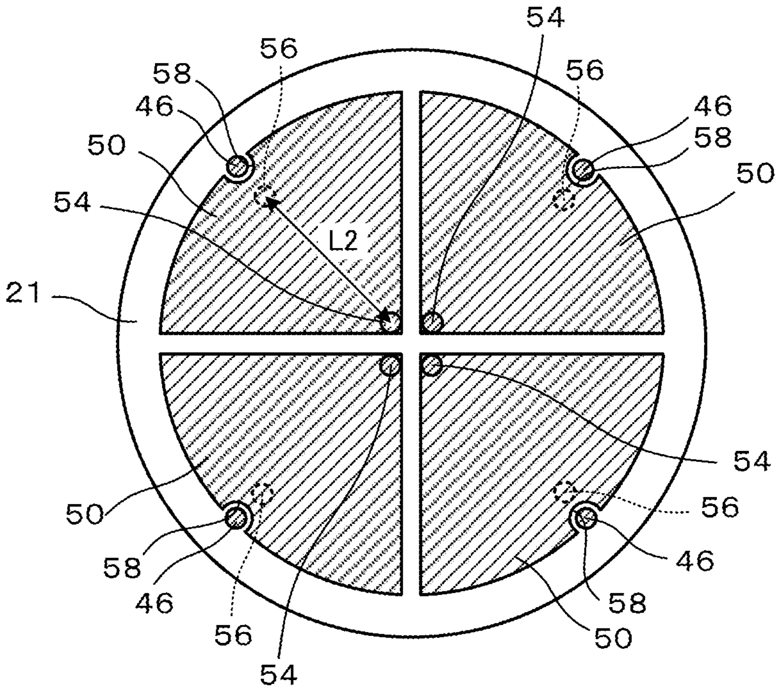
FIG. 5 is a top cross-sectional view of the wafer placement table 10 taken along an upper surface of a first ceramic layer 21.

Preferred embodiments of the present invention will be described with reference to the drawings. FIG. 1 is a plan view of a wafer placement table 10, and FIG. 2 is a cross-sectional view taken along A-A in FIG. 1. FIGS. 3 to 5 are cross-sectional views when the wafer placement table 10 cut in the horizontal direction is viewed from above. In the following description, up-down, right-left, and front-rear may be used. However, these up-down, right-left, and front-rear merely represent relative positional relations.

The wafer placement table 10 includes a ceramic substrate 20 and further includes heater electrodes 30, upper jumper layers 40, and lower jumper layers 50 that are embedded in the ceramic substrate 20.

The ceramic substrate 20 is a ceramic-made circular disk and has, as its upper surface, a wafer placement surface 20*a* for placement of a wafer. Examples of the ceramic include alumina and aluminum nitride. The ceramic substrate 20 is a multilayer structure body. In the present embodiment, the ceramic substrate 20 includes first to fourth ceramic layers 21 to 24 stacked from bottom to top as shown in FIG. 2. The heater electrodes 30 are disposed on the upper surface of the third ceramic layer 23. The heater electrodes 30 are disposed in respective zones. These zones are obtained by dividing the circular shape of the third ceramic layer 23 in plan view into a plurality of sectors (four sectors in the present embodiment). Each of the heater electrodes 30 is formed by placing a resistance heating element in a one-stroke pattern extending from an outer circumferential edge 32 to a center edge 34 over the entire region of the corresponding sector zone. The heater electrodes 30 are formed from a material mixture of a metal and a ceramic. Examples of the metal include Ru, W, and Mo, and a metal having a thermal expansion coefficient close to that of the ceramic substrate 20 is preferred. The ceramic used is the same as the material of the ceramic substrate 20. Since the heater electrodes 30 are formed from the material mixture described above, for example, the occurrence of cracking between the heater electrodes 30 and the ceramic substrate 20 due to the difference in thermal expansion coefficient therebetween can be prevented.

The upper jumper layer 40 has a planar shape and is provided on an upper surface of a second ceramic layer 22. The upper jumper layer 40 has a fan-like shape and is provided for each of the four heater electrodes 30. The upper jumper layer 40 is connected to an outer circumferential end 32 of the corresponding heater electrode 30 via a conductive inner via 42. The inner via 42 extends through the third ceramic layer 23 in the vertical direction. The upper end of the inner via 42 is connected to the outer circumferential end 32 of the heater electrode 30, and the lower end of the inner via 42 is connected to the upper jumper layer 40. The upper end of the conductive feed via 46 is connected to the upper jumper layer 40. The feed via 46 includes an upper columnar member 46*a* and a lower columnar member 46*b* connected to each other in the vertical direction. The upper columnar member 46*a* extends through the second ceramic layer 22 in the vertical direction. The lower columnar member 46*b* extends through the first ceramic layer 21 in the vertical direction. The lower end of the feed via 46 is exposed through the lower surface of the ceramic base 20. The inner via 42 and the feed via 46 may be formed of the same material as the heater electrode 30, for example. A center-to-center distance L1 between the inner via 42 and the feed via 46 in the upper jumper layer 40 is greater than or equal to 50 mm.

The lower jumper layer 50 has a planar shape and is provided on an upper surface of the first ceramic layer 21. The lower jumper layer 50 has a fan-like shape and is provided for each of the four heater electrodes 30. The lower jumper layer 50 is connected to a central end 34 of the corresponding heater electrode 30 via the conductive inner via 54. The inner via 54 extends through the second and third ceramic layers 22 and 23 in the vertical direction. The inner via 54 includes an upper columnar member 54*a* and a lower columnar member 54*b* connected to each other in the vertical direction. The upper columnar member 54*a* extends through the third ceramic layer 23 in the vertical direction. The lower columnar member 54*b* extends through the second ceramic layer 22 in the vertical direction. The upper end of the inner via 54 is connected to the central end 34 of the heater electrode 30, and the lower end of the inner via 54 is connected to the lower jumper layer 50. The upper end of a conductive feed via 56 is connected to the lower jumper layer 50. The feed via 56 extends through the first ceramic layer 21 in the vertical direction. The lower end of the power feed via 56 is exposed through the lower surface of the ceramic base 20. The lower jumper layer 50 has a notch 58 to avoid contact with the feed via 46. The inner via 54 and the feed via 56 may be formed of the same material as the heater electrode 30, for example. A center-to-center distance L2 between the inner via 54 and the feed via 56 in the lower jumper layer 50 is greater than or equal to 50 mm.

Figure 6:
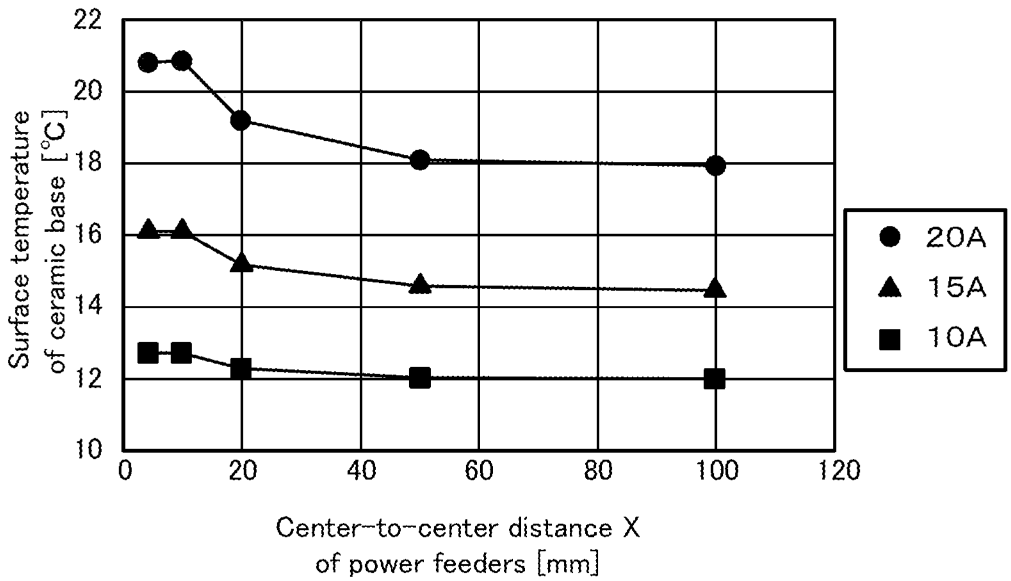
FIG. 6 is a graph indicating relationship between the center-to-center distance X of the power feeders and surface temperatures of the ceramic base.

In the setting of the center-to-center distances L1 and L2, a model in which a disk electrode (corresponding to the jumper layer) having a diameter of 295 mm and a thickness of 0.01 mm is buried in a ceramic base having a diameter of 300 mm and a thickness of 4.3 mm was used. The burial depth of the disk electrode is 1.1 mm from the rear surface of the ceramic base. A first power feeder having a diameter of 1 mm and a thickness of 0.1 mm was disposed at a center of the rear surface of the disk electrode. A second power feeder having a diameter of 1 mm and a thickness of 0.1 mm is disposed at a distance of X mm (center-to-center distance) in the radial direction from the center. The volume resistivity of the disk electrode was $2.5\times10^{-3}$ Ωcm, and the volume resistivity of the first and second power feeders was also $2.5\times10^{-3}$ Ωcm. Then, the relationship between the center-to-center distance between the power feeders and the surface temperature of the ceramic base was calculated in which a direct current was applied between the first power feeder and the second power feeder with the temperature of the rear surface of the ceramic base being kept at 10° C. The currents were 10 A, 15 A, and 20 A. The graph in FIG. 6 indicates the result. As can be seen from the graph, for all the current values, the surface temperature of the ceramic base was converged and stabilized when the center-to-center distance X is greater than or equal to 50 mm. Based on the result, the center-to-center distances L1 and L2 were set at greater than or equal to 50 mm in this embodiment.

Figure 7A:
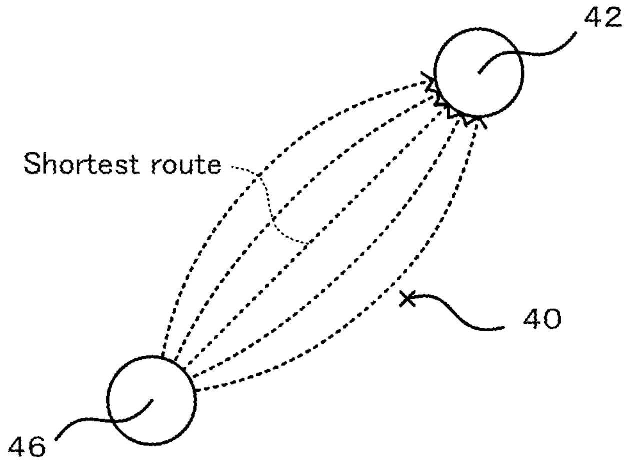
FIGS. 7A and 7B are schematic views illustrating current flowing between an inner via 42 and a feed via 46.
Figure 7B:
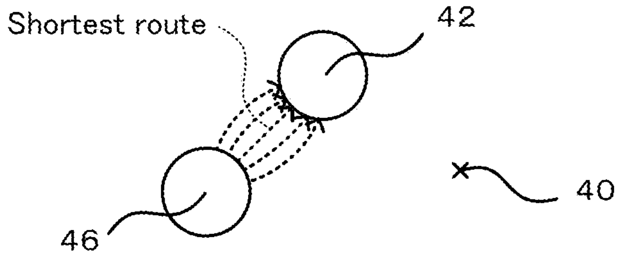

As illustrated in FIG. 7A, when the center-to-center distance L1 between the inner via 42 and the feed via 46 in the upper jumper layer 40 is greater than or equal to 50 mm, the current flows along the relatively largely curved routes on both sides of the shortest route in addition to the shortest route. This can reduce an increase in the current density at the shortest route and its surroundings. Furthermore, the center-to-center distance L1 is long, and thus the generated heat is likely to be readily dispersed. In contrast, as illustrated in FIG. 7B, if the center-to-center distance L1 between the inner via 42 and the feed via 46 in the upper jumper 40 is short (e.g., 10 mm), the current is likely to concentratedly flow along the shortest route and its surroundings. Furthermore, the center-to-center distance L1 is short, and thus the generated heat is unlikely to be readily dispersed. The same applies to the center-to-center distance L2 between the inner via 54 and the feed via 56 in the lower jumper layer 50.

Figures 8A, 8B, 8C:
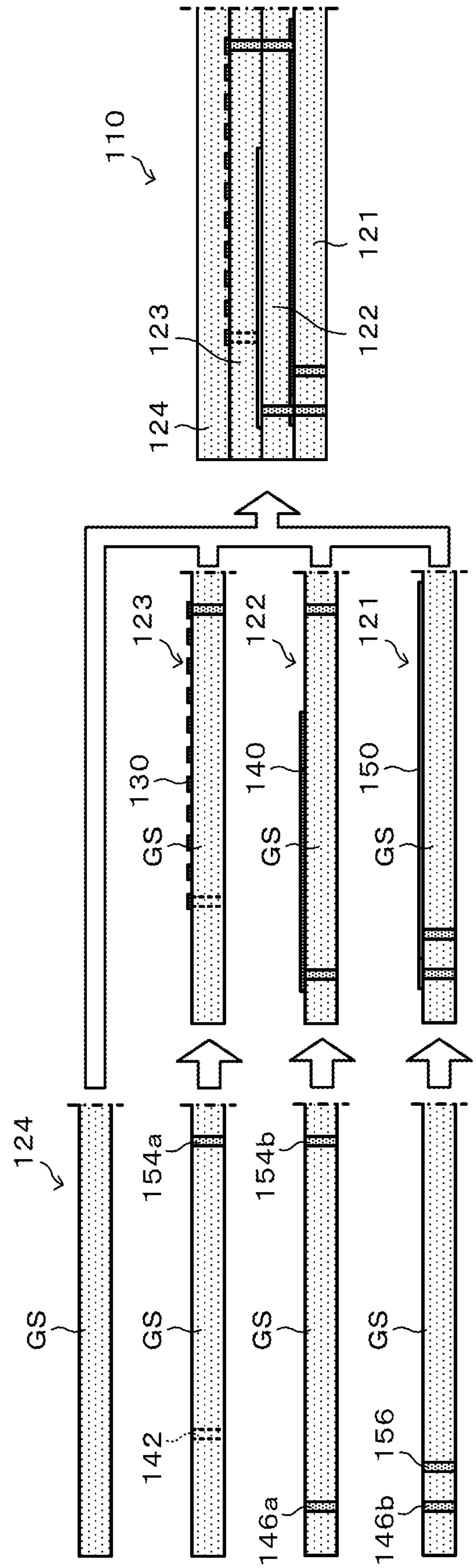
FIGS. 8A to 8C illustrate processes of producing the wafer placement table 10.

Next, an example of a process of producing the wafer placement table 10 will be described with reference to FIGS. 8A to 8C. FIGS. 8A to 8C are views illustrating a process of producing the wafer placement table 10. First, four disc-shaped ceramic green sheets GS are produced. The ceramic green sheets GS are produced by a tape casting method.

For the first ceramic green sheet GS, through holes are made at the positions corresponding to the lower columnar member 46*b* and the feed via 56, and the through holes are filled with a conductive paste to form paste-filled portions 146*b* and 156 (see FIG. 8A). Then, a conductive paste is printed on the upper surface of the ceramic green sheet GS to be in the same pattern as the lower jumper layer 50 to form a lower jumper precursor 150, and thus a first sheet 121 is produced (see FIG. 8B).

For the second ceramic green sheet GS, through holes are made at the positions corresponding to the upper columnar member 46*a* and the lower columnar member 54*b*, and the through holes are filled with a conductive paste to form paste-filled portions 146*a* and 154*b* (see FIG. 8A). Then, a conductive paste is printed on the upper surface of the ceramic green sheet GS to be in the same pattern as the upper jumper layer 40 to form an upper jumper precursor 140, and thus a second sheet 122 is produced (see FIG. 8B).

For the third ceramic green sheet GS, through holes are made at the positions corresponding to the inner via 42 and the upper columnar member 54*a*, and the through holes are filled with a conductive paste to form paste-filled portions 142 and 154*a* (see FIG. 8A). Then, a conductive paste is printed on the upper surface of the ceramic green sheet GS to be in the same pattern as the heater electrode 30 to form a heater electrode precursor 130, and thus a third sheet 123 is produced (see FIG. 8B).

For the fourth ceramic green sheet GS, the ceramic green sheet GS is used as it is as a fourth sheet 124 (FIG. 8A).

Then, the first to fourth sheets 121 to 124 are disposed on top of another in this order from below to form a laminate 110 (see FIG. 8C). The laminate 110 is fired to form the wafer placement table 10.

Next, a usage example of the wafer placement table 10 will be described. Heater power sources (not shown) are connected to the respective heater electrodes 30. Specifically, one of a pair of power supply terminals of each heater power source (the positive electrode of the heater power source) is connected to the power supply via 46 of the corresponding heater electrode 30, and the other one of the pair of power supply terminals of the heater power source (the negative electrode of the heater power source) is connected to the power supply via 56 of the heater electrode 30. Then a wafer is placed on the wafer placement surface 20*a*, and electric power is supplied separately to the heater electrodes 30 to heat the wafer. In this case, the electric power is supplied such that the entire wafer is at the same temperature. The wafer in this state is subjected to processing.

Here, the relationship between the components of the embodiment and the components of the present invention are clarified. The ceramic base 20 of this embodiment corresponds to the ceramic base of the present invention, and the heater electrode 30 corresponds to the heater electrode. Furthermore, the upper jumper layer 40 corresponds to the jumper layer. The center-to-center distance L1 between the inner via 42 and the feed via 46 in the upper jumper layer 40 is greater than or equal to 50 mm. Furthermore, the lower jumper layer 50 corresponds to the jumper layer. The center-to-center distance L2 between the inner via 54 and the feed via 56 in the lower jumper layer 50 is greater than or equal to 50 mm.

In the above-described wafer placement table 10 of the embodiment, the center-to-center distance L1 between the inner via 42 and the feed via 46 in the upper jumper layer 40 is greater than or equal to 50 mm. Thus, the current flows along the relatively largely curved routes on both sides of the shortest route, in addition to the shortest route between the inner via 42 and the feed via 46 in the upper jumper layer 40. This can reduce an increase in the current density at the shortest route and its surroundings. Furthermore, the center-to-center distance L1 is long, and thus the generated heat is likely to be readily dispersed. The same applies to the inner via 54 and the feed via 56 in the lower jumper layer 50. Thus, the local heating in the upper jumper layer 40 and the lower jumper layer 50 can be reduced.

The present invention should not be limited to the above-described embodiment and may be implemented in various modes without departing from the technical scope of the present invention.

Figure 9:
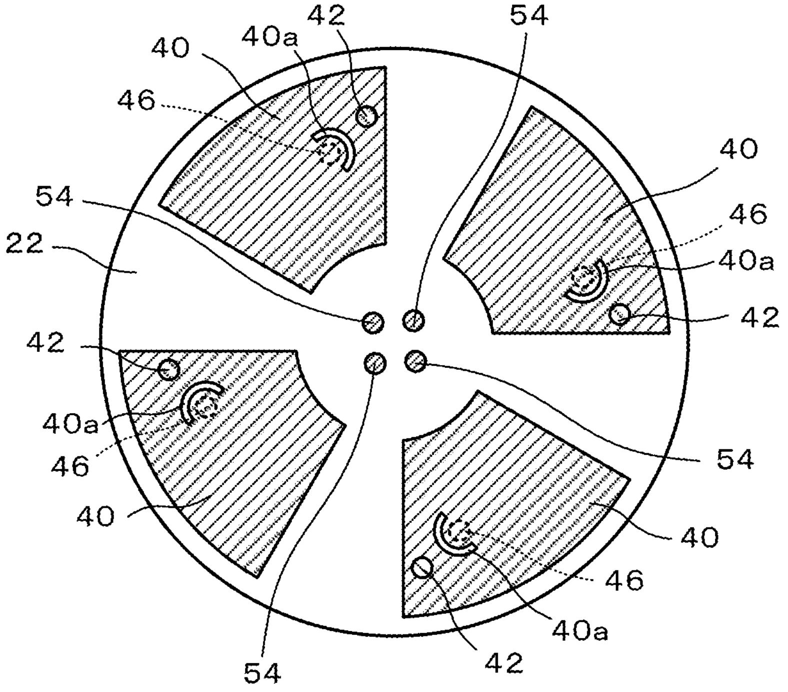
FIG. 9 is a plan view of an upper jumper layer 40 having slits 40*a*.
Figure 10:
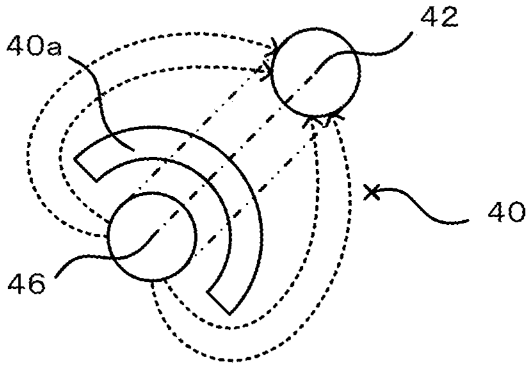
FIG. 10 is a plan view of the slit 40*a* and its surroundings.

For example, in the above-described embodiment, instead or in addition to the configuration in which the center-to-center distance L1 between the inner via 42 and the feed via 46 in the upper jumper layer 40 along the shortest route is greater than or equal to 50 mm, as illustrated in FIGS. 9 and 10, the upper jumper layer 40 may have an arc-shaped slit 40*a* between the inner via 42 and the feed via 46 to block the shortest route (dot-dash line in FIG. 10) between the inner via 42 and the feed via 46. In FIGS. 9 and 10, the center-to-center distance L1 of the shortest route is less than 50 mm (for example, 10 mm or 20 mm). The slit 40*a* is an example of a high-resistance section and intersects two tangent lines (dot-dot-dash line in FIG. 10) to an outline of the inner via 42 and an outline of the feed via 46. Furthermore, the slit 40*a* is a circular section having an arc shape (here, semi-circular shape) centered at the feed via 46. In this case, as illustrated in FIG. 10, the current flows outside the slit 40*a* (see, dotted line arrows). This can reduce an increase in the current density at the shortest route between the inner via 42 and the feed via 46 and its surroundings. Thus, local heating in the upper jumper layer 40 can be reduced. The slit 40*a* is a section extending through the upper jumper layer 40 in the vertical direction. However, instead of the slit 40*a*, a thinner section may be provided in the upper jumper layer 40 as the high-resistance section. Furthermore, the lower jumper layer 50 may have a similar high-resistance section (such as a slit) between the inner via 54 and the feed via 56.

Figure 11:
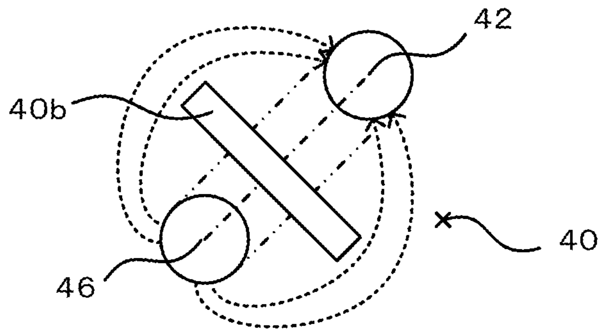
FIG. 11 is a plan view of a slit 40*b* and its surroundings.
Figure 12:
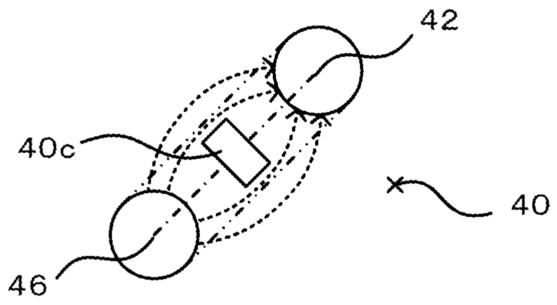
FIG. 12 is a plan view of a slit 40*c* and its surroundings.

Instead of the slit 40*a*, a slit 40*b* or a slit 40*c* illustrated in FIGS. 11 and 12 may be employed. The slit 40*b* in FIG. 11 is rectangular and is in the upper jumper layer 40 to block the shortest route (dot-dash line in FIG. 11) between the inner via 42 and the feed via 46. Furthermore, the slit 40*b* intersects two tangent lines (dot-dot-dash line in FIG. 11) to outlines of the inner via 42 and the feed via 46. The slit 40*b* can provide the same effect as the slit 40*a*. However, the arc-shaped slit 40*a*, which largely diverts the current, is preferable to the rectangular slit 40*b*. The slit 40*c* in FIG. 12 is rectangular and is in the upper jumper layer 40 to block the shortest route (dot-dash line in FIG. 12) between the inner via 42 and the feed via 46. However, the slit 40*c* does not intersect two tangent lines (dot-dot-dash line in FIG. 12) to outlines of the inner via 42 and the feed via 46. The slit 40*c* can provide substantially the same effect as the slit 40*a*, but the slits 40*a* and 40*b* can provide more prominent effect than the slit 40*c*, which does not intersect the two tangent lines. Even when a high-resistance section is provided, the center-to-center distance L1 between the inner via 42 and the feed via 46 in the upper jumper layer 40 along the shortest route is preferably greater than or equal to 50 mm. Similarly, even if a high-resistance section is provided, the center-to-center distance L2 between the inner via 54 and the feed via 56 in the lower jumper layer 50 along the shortest route is preferably greater than or equal to 50 mm.

In the embodiment described above, the ceramic substrate 20 may include an electrostatic chuck electrode disposed at a position close to the wafer placement surface 20*a*. The electrostatic chuck electrode is connected to a DC power source. By applying a DC voltage to the electrostatic chuck electrode, a wafer placed on the wafer placement surface 20*a* is sucked and fixed to the wafer placement surface 20*a*. The ceramic substrate 20 may include therein an RF electrode for plasma generation.

In the embodiment described above, the wafer placement table 10 may have a plurality of holes passing vertically through the wafer placement table 10. Examples of these holes include a plurality of gas holes having openings on the wafer placement surface 20*a* and lift pin holes for insertion of lift pins that move a wafer up and down with respect to the wafer placement surface 20*a*.

In the embodiment described above, a seal band may be disposed along the outer circumferential edge of the wafer placement surface 20*a*, and a plurality of small protrusions (flattened circular protrusions) may be provided in a region inside the seal band. In this case, the seal band and the plurality of small protrusions are disposed such that the top face of the seal band is flush with the top faces of the plurality of small protrusions. The wafer is supported by the top face of the seal band and the top faces of the plurality of small protrusions.

In the embodiment described above, the ceramic green sheets GS are used to produce the ceramic substrate 20, but this is not a particular limitation. For example, ceramic molded bodies obtained by packing ceramic powders may be used, or ceramic molded bodies produced by a mold casting method may be used. A combination of these methods may also be used.

International Application No. PCT/JP2022/030570, filed on Aug. 10, 2022, is incorporated herein by reference in its entirety.

What is claimed is:

1. A wafer placement table comprising:

a ceramic base having a wafer placement surface;

resistance heating elements buried in the ceramic base;

jumper layers having a planar shape and provided in a different layer from the resistance heating elements;

an inner via connecting the jumper layer and an end of the resistance heating element; and a feed via connected to the jumper layer, wherein each of the resistance heating elements is provided for each of zones of a surface parallel to the wafer placement surface, each of the jumper layers is provided for each of the resistance heating elements, and a center-to-center distance between the inner via and the feed via in each of the jumper layers is greater than or equal to 50 mm.

2. The wafer placement table according to claim 1, further comprising a high-resistance section in each of the jumper layers at a position between the inner via and the feed via to block a shortest route between the inner via and the feed via.

3. The wafer placement table according to claim 2, wherein the high-resistance section is a slit in each of the jumper layers.

4. The wafer placement table according to claim 2, wherein the high-resistance section intersects two tangent lines that are tangent to each of an outline of the inner via and an outline of the feed via.

5. The wafer placement table according to claim 2, wherein the high-resistance section is an arc-shaped section centered at one of the inner via and the feed via.

6. The wafer placement table according to claim 1, wherein the ceramic base is a multilayer structure body including first to fourth ceramic layers stacked from bottom to top.

7. The wafer placement table according to claim 6, wherein the resistance heating elements are disposed between the third and fourth ceramic layers of the ceramic base.

8. The wafer placement table according to claim 6, wherein the jumper layers include upper jumper layers and lower jumper layers.

9. The wafer placement table according to claim 8, wherein the upper jumper layers are disposed between the second and third ceramic layers of the ceramic base.

10. The wafer placement table according to claim 8, wherein the lower jumper layers are disposed between the first and second ceramic layers of the ceramic base.

* * * * *